Nov. 12, 1940.                W. A. KUEHL                2,221,422
                        ELECTRIC SOLDERING IRON
                          Filed June 14, 1940
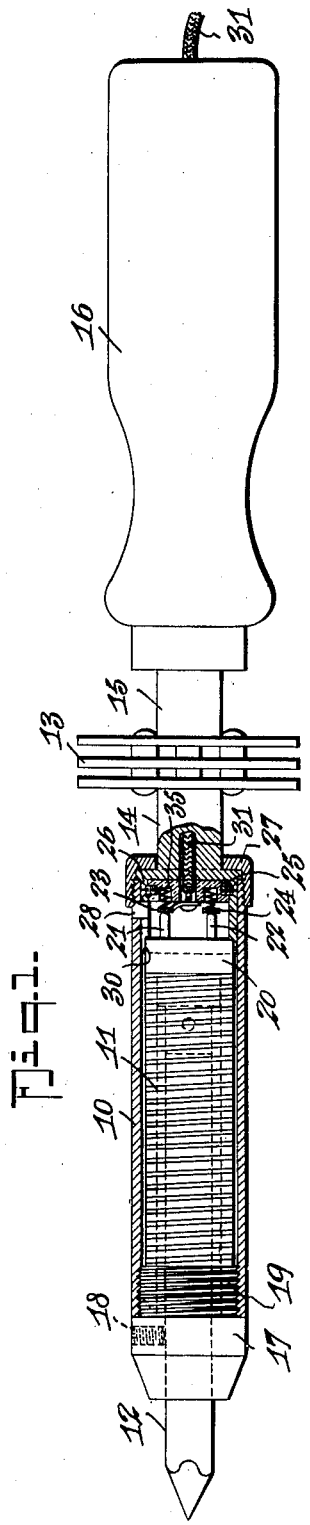
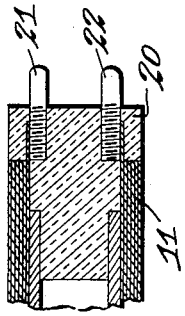
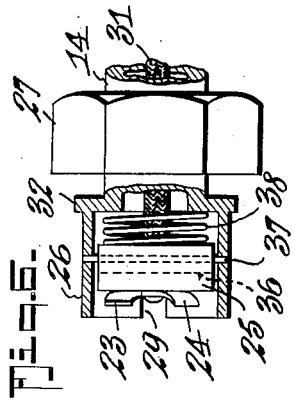
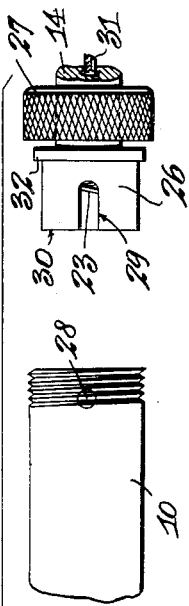
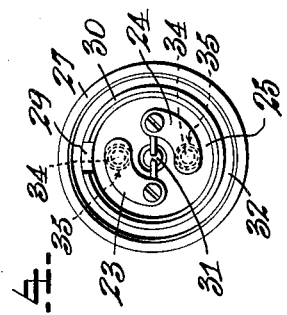
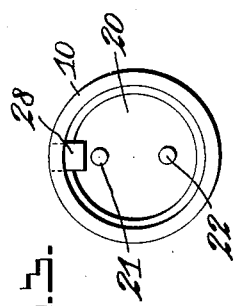
Inventor
W. A. Kuehl.
By
Ben J. Chromy
Attorney Patented Nov. 12, 1940

2,221,422

UNITED STATES PATENT OFFICE 2,221,422

ELECTRIC SOLDERING IRON

Walter A. Kuehl, Chicago, Ill.

Application June 14, 1940, Serial No. 340,616

10 Claims. (Cl. 219—26)

This invention relates to electric soldering irons in general. More particularly this invention relates to an electric soldering iron in which the heating element is readily replaced.

An object of this invention is to provide a soldering iron in which the heating element may be readily replaced by a new heating element or by a larger or a smaller heating element for different kinds of work.

Another object of this invention is to provide a soldering iron in which the heating element is connected by means of a practical and efficient socket arrangement to the electrical connections passing through the handle of the iron, said socket arrangement having the contact elements thereof constructed out of heat resistant material so that poor electrical contacts therebetween are prevented even though said socket elements may be subjected to some heat from the heating unit.

Other and further objects of this invention will be apparent to those skilled in the art to which it relates from the following specification and the claims.

In accordance with this invention I provide a readily-removable-heating-element soldering iron of very practical construction which may be readily made and is efficient in operation. The iron of my invention is assembled in such a way that the renewability of the heating element is not a detriment because of the detachable connections employed adjacent to the heating element, but is rather an advantage inasmuch as the operation of the detachable connection arrangement made use of will not deteriorate after prolonged use. Consequently since the drawbacks of a detachable connection adjacent to the heating element have been overcome by my invention the full advantages of this arrangement may be realized since one heating element may be substituted for another without being annoyed with scraping the detachable connections before attaching a new heating element or cleaning said connections while interrupting soldering operations because of the increase of the resistance of the contacts in the connections caused by heat. Furthermore provision has been made in my invention for spring contacts made out of material which will not lose its resilience when subjected to heat ordinarily encountered in this construction. Consequently the connections in my soldering iron are made of a very simple nature because no precautions need be taken for mechanically gripping the heating element connecting pins as has been proposed. The disadvantage of the mechanical gripping arrangement is that heat may so corrode the surfaces that they tend to become cemented together by high resistance products of heat corrosion, thus making them difficult to separate when it is desired to replace the heating element.

My invention has eliminated difficulties encountered in prior constructions proposing removable heating elements for soldering irons and makes this type of soldering iron useful in practice. Further details of this invention will be set forth in the following specification and the drawing in which briefly:

Fig. 1 is a cross-section of the detachable heating element connection of my invention; Fig. 2 is a view showing how the housing over the detachable connections is assembled; Fig. 3 is an end view of the connecting pins and mounting; Fig. 4 is an end view of the spring contacts and mounting; Fig. 5 is a sectional view of one form of mounting for the contact pins and Fig. 6 illustrates a modified form of mounting for the spring biased contacts.

Referring to the drawing in detail reference numeral 10 designates the tubular housing for the heating element 11 which consists of a winding of "Nichrome," German silver, iron or the like and is constructed in substantially the same general manner as the heating element described in my prior Patent No. 2,147,981.

The baffles 13 attached to the tubular members 14 and 15 are also constructed in substantially the same manner as corresponding baffles illustrated in my prior patent. These baffles are provided for the purpose of obstructing the passage of heat from the heating element through the tubular members 14 and 15 to the handle 16. The heating element 11 consists of windings of resistance material wound into a tubular coil insulated with mica and having a hollow central portion for receiving the elongated soldering iron point member 12. This elongated member extends almost throughout the length of the heating element and is heated thereby. It will be observed that a small air space is provided between the heating element 11 and the housing 10 to decrease the passage of heat to the housing. The point 12 is fastened by means of the set screw 18 into the plug 17 which is threaded into the end of the housing 10 by means of threads 19. Of course the set screw 18 could be employed for fastening both the point 12 and the plug 17 to the end of the housing 10 if this is desired.

A cup-shaped flange member 26 is attached to the end of the tubular member 14 as illustrated.

This cup-shaped flange member may be made integral with the tubular member 14 if desired or it may be heated and tightly fitted over the end of this tubular member while the latter is cold. The inner diameter of the flange of the coupling member 27 is of slightly larger size than the outer diameter of the tubular member 14 to fit loosely over the latter. This coupling member must be placed upon the tubular member 14 either before the cup-shaped flange member 26 is attached thereto or before the baffles 13 are fitted and assembled thereon. Of course in soldering irons of relatively small sizes, for instance, those consuming less than 100 watts the baffles 13 may be dispensed with without producing objectionable heating of the handle.

The flange 32 of the cup-shaped member 26 abuts the end of the heating element housing 10 and is clamped in this position by means of the coupling member 27 which is threaded to the heating element housing. The cup-shaped portion of the element 26 extends into the heating element housing and the inner edge 30 thereof extends a short distance around the circumference of the insulation block 20 which forms one end of the heating element 11. This insulation block 20 is composed of heat resistant material such as, lava, "alsimag," synthetic porcelain and the like and is employed to support the connecting plugs or pins 21 and 22 which contact the ends of the heating conductors in the heat element 11. These plugs or pins may be threaded into the insulation blocks and the ends of the heating element placed along side of the threaded portions of the plugs as illustrated in Fig. 5 so as to provide good electrical connection therewith.

The contact plugs 21 and 22 engage the leaf spring connectors 23 and 24 respectively so as to connect the heating element 11 to the electrical conductor 31 through the leaf spring contacts 23 and 24. This electrical conductor passes through the hollow central portion of the tubular members 14 and 15 and the handle 16.

The cup-shaped portion of the member 26 is provided with a notch 29 for receiving the pin 28 carried by the housing 10 and projecting into said housing. The purpose of this pin and notch is to insure proper alignment of the plug contactors 21 and 22 with the leaf spring connectors 23 and 24 respectively when the soldering iron is assembled or re-assembled. The leaf springs 23 and 24 are shaped so that the plug contactors engage the free end portions thereof extending away from the insulated block 25 inasmuch as these portions exert the greatest pressure against the plug contacts and insure the best electrical connection.

The free ends of the leaf spring contacts 23 and 24 are backed by coil expansion springs 34 tempered so that they do not lose their resilience at temperatures normally encountered in soldering irons. Small sockets 35 are provided in the insulation block 25, which is also of heat resistant material, such as, lava, "alsimag," synthetic porcelain and the like, and the springs 34 fit into these sockets. Suitable screws are threaded into the block 25 for holding the contactors 23 and 24 thereon.

These leaf spring contacts 23 and 24 may be made of spring temper phosphor-bronze with a facing of "fasaloy #5" contact material. The pins 21 and 22 may be made of silver clad steel backings with a facing of "fasaloy #5" contact material. This insures an efficient connection to the heating element.

In the construction illustrated the end 30 of cup-shaped member 26 extends around the block 20 and this serves to space the outside of the heating element from the inner surface of the housing to provide a dead air space therebetween.

The lava, or other insulation material, contact block 25 may be mounted in floating spring urged fashion as illustrated in Fig. 6 to press the contacts 23—24 against the contact pins 21—22 respectively. For this purpose the coil spring 38 is positioned behind the lava block 25 and this spring exerts a pressure on this block tending to push the latter out of the cup-shaped member 26. However a pin 37 is mounted in the cup-shaped member 26 and this pin engages the block 25 in the hole 36 to arrest said block in said cup-shaped member and prevent it from being forced out when the lock nut 27 is unscrewed from the heating element housing 10 and the heating element contacts 21—22 are disengaged from the spring contacts 23—24. It will be observed that the hole 36 is substantially larger in cross-section than the pin 37. This permits some backward and forward movement of the block 25 so that when the contacts 23—24 engage the pins 21—22 they may press the block 25 against the spring 38.

It will be observed that I have described this invention in detail in its preferred embodiment, however, I do not desire to limit it to the exact details shown and described except insofar as these are defined by the claims.

What I claim is:

1. An electric soldering iron, comprising: a handle, tubular means attached to said handle, a heating element, a housing for said heating element, coupling means for attaching said heating element housing to said tubular means remote from said handle, said coupling means consisting of a flange member on said tubular means, and a threaded member engaging said flange member and threaded to said housing, electrical connections extending through said handle and said tubular means, a substantially heat resistant electrical insulation block mounted in said coupling means adjacent to said tubular means, a pair of leaf spring contacts attached to said insulation block and connected to said electrical connections, a second insulation block positioned against one end of said heating element, a pair of contact pins carried by said second insulation block connected to said heating element and abutting said leaf spring contacts, an aligning member engaging said first mentioned insulation block and a pin positioned on said heating element housing for engaging said aligning member to insure said contact pins abutting and compressing said leaf springs when said heating element housing is attached to said tubular means by said coupling means.

2. An electric soldering iron, comprising: a handle, tubular means attached to said handle, a heating element, a housing for said heating element, coupling means for attaching said heating element housing to said tubular means remote from said handle, said coupling means consisting of a flange member on said tubular means and a cup-shaped element extending into said heating element housing, and a threaded member engaging said flange member and threaded to said housing, electrical connections extending through said handle and said tubular means, a substantially heat resistant electrical insulation block mounted in said cup-shaped element, a pair of leaf spring contacts attached to said insulation block and connected to said electrical connections, a second insulation block positioned against one end of said heating element, a pair of contact pins carried by said second insulation block connected to said heating element and abutting said leaf spring contacts, said cup-shaped element having a notch formed therein, a pin positioned on said heating element housing for engaging said notch to insure said contact pins abutting and compressing said leaf springs when said heating element housing is attached to said tubular means by said coupling means.

3. An electric soldering iron, comprising: a handle, tubular means attached to said handle, a heating element, a housing for said heating element, a substantially heat resistant insulation block positioned against one end of said heating element, coupling means for attaching said heating element housing to said tubular means remote from said handle, said coupling means consisting of a flange member on said tubular means and a cup-shaped element fitting into said housing adjacent the inner wall thereof and extending into said housing a short distance to abut said insulation block and maintain one end of said heating unit in spaced relation with respect to said housing, electrical connections extending through said handle and said tubular means, a second substantially heat resistant electrical insulation block mounted in said cup-shaped element, a pair of leaf spring contacts attached to said second insulation block and connected to said electrical connections, a pair of contact pins carried by said first insulation block connected to said heating element and abutting said leaf spring contacts, an aligning member on said heating element housing for engaging a notch in said cup-shaped member to insure said contact pins abutting and compressing said leaf springs when said heating element housing is attached to said tubular means by said coupling means.

4. An electric soldering iron, comprising: a handle, tubular means attached to said handle, a heating element, a housing for said heating element, a substantially heat resistant insulation block positioned against one end of said heating element, coupling means for attaching said heating element housing to said tubular means remote from said handle, said coupling means consisting of a flange member on said tubular means and a cup-shaped element fitting into said housing adjacent the inner wall thereof and extending into said housing a short distance to abut said insulation block and maintain one end of said heating unit in spaced relation with respect to said housing, electrical connections extending through said handle and said tubular means, a second substantially heat resistant electrical insulation block mounted in said cup-shaped element, a pair of leaf spring contacts attached to said second insulation block and connected to said electrical connections, a pair of contact pins carried by said first insulation block connected to said heating element and abutting said leaf spring contacts, a pair of coil springs, one of said coil springs behind each of said leaf springs to urge the corresponding leaf spring outward from said second insulation block against the corresponding one of said pins, an aligning member on said heating element housing for engaging a notch in said cup-shaped member to insure said contact pins abutting and compressing said leaf springs when said heating element housing is attached to said tubular means by said coupling means.

5. An electric soldering iron, comprising: a handle, tubular means attached to said handle, a heating element, a housing for said heating element, a coupling member for attaching said heating element housing to said tubular means remote from said handle, electrical connections extending through said handle and said tubular means, a substantially heat resistant electrical insulation block floatingly mounted in said coupling member adjacent to said tubular means, a pair of leaf spring contacts attached to said insulation block and connected to said electrical connections, a second insulation block positioned against one end of said heating element, a pair of contact pins carried by said second insulation block connected to said heating element and abutting said leaf spring contacts, spring means positioned behind said first mentioned insulation block for urging said leaf spring contacts against said contact pins, a pin for limiting the movement of said first mentioned insulation block, an aligning member engaging said first mentioned insulation block and a pin positioned on said heating element housing for engaging said aligning member to insure said contact pins abutting and compressing said leaf springs when said heating element housing is attached to said tubular means by said coupling member.

6. An electric soldering iron, comprising: a handle, tubular means attached to said handle, a heating element, a housing for said heating element, coupling means for attaching said heating element housing to said tubular means remote from said handle, said coupling means consisting of a flange member on said tubular means, and a threaded member engaging said flange member and threaded to said housing, electrical connections extending through said handle and said tubular means, a substantially heat resistant electrical insulation block floatingly mounted in said coupling means adjacent to said tubular means, a pair contacts attached to said insulation block and connected to said electrical connections, a second insulation block positioned against one end of said heating element, a pair of contact pins carried by said second insulation block connected to said heating element and abutting said first mentioned contacts, spring means positioned behind said first mentioned insulation block for pressing said first mentioned contacts against said contact pins, an aligning member engaging said first mentioned insulation block and a pin positioned on said heating element housing for engaging said aligning member to insure said contact pins abutting said first mentioned contacts when said heating element housing is attached to said tubular means by said coupling means.

7. An electric soldering iron, comprising: a handle, tubular means attached to said handle, a heating element, a housing for said heating element, a coupling member for attaching said heating element housing to said tubular means remote from said handle, electrical connections extending through said handle and said tubular means, a substantially heat resistant electrical insulation block floatingly mounted in said coupling member adjacent to said tubular means, a pair of contacts attached to said insulation block and connected to said electrical connections, a second insulation block positioned against one end of said heating element, a pair of contact pins carried by said second insulation block connected to said heating element and abutting said first pair of contacts, spring means positioned behind said first mentioned insulation block for urging said first pair of contacts against the corresponding contact pins, and means for aligning said contact pins with the corresponding first mentioned contacts when said heating element housing is attached to said tubular means by said coupling member.

8. An electric soldering iron, comprising: a handle, tubular means attached to said handle, a heating element, a housing for said heating element, coupling means for attaching said heating element housing to said tubular means remote from said handle, said coupling means consisting of a flange member on said tubular means, and a threaded member engaging said flange member and threaded to said housing, electrical connections extending through said handle and said tubular means, a substantially heat resistant electrical insulation block in said coupling means adjacent to said tubular means, contacts attached to said insulation block and connected to said electrical connections, a second insulation block positioned against one end of said heating element, a pair of contact pins carried by said second insulation block connected to said heating element and abutting said contacts, means in said coupling means for urging said first mentioned insulation block toward said second insulation block to press said contacts against said contact pins, and aligning means to insure said contact pins abutting said contacts when said heating element housing is attached to said tubular means by said coupling means.

9. An electrical soldering iron, comprising: a handle, tubular means attached to said handle, a heating element, a housing for said heating element, a coupling member for attaching said heating element housing to said tubular means remote from said handle, electrical connections extending through said handle and said tubular means, a substantially heat resistant electrical insulation block floatingly mounted in said coupling member adjacent to said tubular means, a pair of contacts attached to said insulation block and connected to said electrical connections, a second insulation block positioned against one end of said heating element, a pair of contact pins carried by said second insulation block connected to said heating element and abutting said first mentioned contacts, spring means positioned behind said first mentioned insulation block for urging said first mentioned contacts against said contact pins, a pin for limiting the movement of said first mentioned insulation block, and means for aligning said contact pins with said first mentioned contacts when said heating element housing is attached to said tubular means by said coupling member.

10. An electrical soldering iron, comprising: a handle, tubular means attached to said handle, a heating element, an insulation block for said heating element, a pair of terminals connected to said heating element and supported by said insulation block, a housing for said heating element, said insulation block and said terminals, a hollow coupling member for attaching said heating element housing to said tubular means remote from said handle, a second insulation block positioned in said hollow coupling member, a pair of terminals attached to said second insulation block and contacting said first mentioned terminals, electrical connections connected to said second mentioned terminals and extending through said tubular means and said handle, and a spring, one end of said spring engaging a surface of said tubular means and the other end engaging said last mentioned insulation block for urging the terminals carried by said last mentioned block against the corresponding terminals of said first mentioned block.

WALTER A. KUEHL.